United States Patent
Park et al.

(10) Patent No.: US 6,633,519 B2
(45) Date of Patent: Oct. 14, 2003

(54) OPTICAL PICK-UP DEVICE OF DISK PLAYER

(75) Inventors: Hee Jin Park, Daegu (KR); In Woo Lee, Pyeongtaeg (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 09/899,111

(22) Filed: Jul. 6, 2001

(65) Prior Publication Data

US 2002/0003768 A1 Jan. 10, 2002

(30) Foreign Application Priority Data

Jul. 8, 2000 (KR) ........................................ 2000/39133
Oct. 25, 2000 (KR) ........................................ 2000/63050

(51) Int. Cl.[7] .............................................. G11B 7/00
(52) U.S. Cl. .............................. 369/44.14; 369/44.15; 369/112.23; 359/813
(58) Field of Search .................... 369/44.11, 44.12, 369/44.14, 44.15, 44.16, 44.21, 112.23; 359/813, 814, 823, 824

(56) References Cited

U.S. PATENT DOCUMENTS 5,144,607 A * 9/1992 Ishida et al. .............. 369/44.15
5,566,149 A * 10/1996 Song ........................ 369/44.15

* cited by examiner

*Primary Examiner*—Muhammad Edun
(74) *Attorney, Agent, or Firm*—Birch, Stewart, Kolasch & Birch, LLP

(57) ABSTRACT

An optical pick-up device includes: a yoke plate having yokes formed at a front side where a magnetic body and a magnetic driving coil are positioned to drive an objective lens; a frame molded to the yoke plate in such a manner that a portion of the rear side of the yoke plate is inserted thereinto; and a PCB with at least two portions fixed to the frame, for applying a drive signal to the magnetic driving unit. Since the frame is press-fit to the yoke plate and the PCB with several portions coated with the adhesive is fixedly attached to the frame, it is not necessary to use an engaging member such as a screw, so that its assembly can be improved and the frame and the PCB can be prevented from being shaken.

19 Claims, 9 Drawing Sheets

OPTICAL PICK-UP DEVICE OF DISK PLAYER

BACKGROUND OF THE INVENTION

1. Field of the Invention

The present invention relates to a slim type optical pick-up device for recording and/or reproducing information into and from an optical disk.

2. Description of the Background Art

In general, an optical pick-up device records and/or reproduces information by transmitting and receiving a light to and from the optical disk. According to an notebook computer or an portable disk player is more and more slim, the optical pick-up device for an notebook computer or an portable disk player is needed more compact FIG. 1 is a schematic view showing the construction of an optical pick-up device in accordance with a conventional art.

As shown in FIG. 1, in the conventional optical pick-up device, a frame 20 is installed at a rear side of a yoke plate 10, and a printed circuit board (PCB) 30 is mounted at a rear side of the frame 20 and connected to an pick-up driving circuit through a flexible print circuit (FPC) 33.

An outer yoke 12 and an inner yoke 13 stand at a front side of the yoke plate 10, and permanent magnets 17 and 18 are fixed in a facing manner between the two yokes 12 and 13.

A holder 40 is positioned at a front side of the yoke plate 10, which is supported by four suspension wires 35 connected to the PCB 30.

The holder 40 includes an objective lens 41 for focussing light radiated from a light source on a recording layer of the optical disk, and a magnetic driving coils 45 for varying a position of the holder 40 horizontally and vertically according to the mutual interaction with the permanent magnets 17 and 18.

The frame 20 is provided with holes 21, through which the suspension wires 35 pass. The suspension wires 35 are made of a conductive material so that a signal outputted from the PCB 30 can be applied to the magnetic driving coils 45.

In the optical pick-up device, in a state that the holder 40 is supported by the suspension wires 35, as it moves vertically and horizontally according to a mutual interaction between the magnetic driving coils 45 and the permanent magnets 17 and 18, the position of the objective lens 41 can be varied, and accordingly, focussing and tracking operations are performed.

With reference to FIGS. 2 through 4, a coupling structure between the yoke plate 10, the frame 20 and the PCB 30 will now be described.

FIGS. 2 and 3 are a side view and a plan view showing the coupling structure of the yoke plate, the frame and the PCB, and FIG. 4 is a development view of the yoke plate.

With reference to FIG. 4, as for the yoke plate 10, an outer yoke 12 and an inner yoke 13 are formed bent upwardly at the front side of a bottom portion 11, side portions 14 are formed bent upwardly at both sides of the yoke plate 10, and a fixing portion 15 is formed bent upwardly at the rear side.

A fixing portion 15 includes a hole 15a at the central portion to engage a screw 31 therethrough.

With reference to FIGS. 2 and 3, in the yoke plate 10, the permanent magnets 17 and 18 are fixed in a manner of attaching to the outer yoke 12 and the inner yoke 13, and the frame 20 and the PCB 30 are threaded by the screw 31 at the rear side of the fixing portion 15.

However, the conventional optical pick-up device as described above has the following problem. That is, as shown in FIGS. 2 and 4, since the height and the width of the inner yoke 13 are formed shorter and smaller than those of the outer yoke 12, the inner yoke 13 has a relatively restricted coercive force of the permanent magnet 18, at which an operation characteristic of the optical pick-up device is degraded.

The reason why the inner yoke 13 is formed smaller than the outer yoke 12 is that, with reference to FIG. 4, the hole 15a is formed in the fixing portion 15 of the yoke plate 10, through which the PCB 30 and the frame 20 are threaded by the screw 31, and in this respect, in order to obtain a sufficient supporting force against the PCB 30 and the frame 20 as well as to provide the hole 15a at the fixing portion 15, there is a limitation to reduce the area of the fixing portion 15. Otherwise, if the optical pick-up device is desired to be designed compact under the condition that the fixing portion 15 is enlarged, the size of the inner yoke 13 is relatively reduced.

Consequently, in order for the fixing portion 15 to form the hole 15a for threading as well as obtain a sufficient supporting area, the inner yoke 13 is inevitably limited in its size.

If the fixing portion 15 is designed to have a sufficient supporting area while increasing the size of the inner yoke 13, the overall yoke plate 10 is enlarged, causing a problem that the optical pick-up device wouldn't be designed compact.

The above-described conventional optical pick-up device has another problem. The PCB 30 and the frame 20 are fixed by being threaded by one screw 31 at the fixing portion 15 of the yoke plate 10, so that if the engaging force of the screw 31 is weakened or due to the typically flexible characteristic of the PCB 30, as shown in FIG. 5, when the holder 40 is moved vertically or horizontally, the PCB 30 and the frame 20 are simultaneously moved, causing an abnormal movement of an objective lens 41, resulting in failure of a normal focussing and tracking operation.

In other words, when the holder 40 is moved according to a mutual interaction between the magnetic driving coil 45 and the permanent magnets 17 and 18, if the PCB 30 connected to the suspension wires 35 are inclined vertically or horizontally, the central axis of the objective lens 41 would deviate from the center position as shown in FIG. 5. And at this time, a normal focussing and tracking operation do not made, so that the performance of the optical pick-up device is degraded.

SUMMARY OF THE INVENTION

Therefore, an object of the present invention is to provide an optical pick-up device which is capable of being designed more compactness while heightening a coercive force of a permanent magnet and capable of improving an operation characteristic and performance for an optical pick-up by fixing a PCB and a frame at a yoke plate without being shaken.

To achieve these and other advantages and in accordance with the purpose of the present invention, as embodied and broadly described herein, there is provided an optical pick-up device including: a yoke plate having yokes formed at a front side where a magnetic body and a magnetic driving unit are positioned to drive an objective lens; a frame fixed to the yoke plate in such a manner that a portion of the rear side of the yoke plate is inserted thereinto; and a PCB with at least two portions fixed to the frame, for applying a drive signal to the magnetic driving unit.

In the optical pick-up device of the present invention, the yoke plate includes: an outer yoke bent in the orthogonal direction to a bottom portion at the front side; an inner yoke cut at the middle portion of the yoke plate and bent in the same direction of the outer yoke; and an insertion portion bent in the orthogonal direction to the bottom portion so as for the frame to be fixed thereto.

In the optical pick-up device of the present invention, the outer yoke and the inner yoke are formed having the same size, and the insertion portion is formed in a 'U' shape.

In the optical pick-up device of the present invention, as for the inner yoke, its upper portion is cut at the inner portion of the insertion portion beyond the line where the insertion portion is bent from the bottom portion.

In the optical pick-up device of the present invention, the objective lens and the magnetic driving unit are installed at a holder, and the holder is supported by a plurality of suspension wires connected to the PCB.

In the optical pick-up device of the present invention, the frame includes holes through which the suspension wires pass, and the holes are formed with its upper portion opened so that the suspension wires can be easily inserted thereto.

In the optical pick-up device of the present invention, a thread hole is formed at both the PCB and the frame, and a screw is engaged at the thread holes of the PCB and the frame, and at the same time, at least one portions of the PCB and the frame are attached by an adhesive to be mutually fixed.

In the optical pick-up device of the present invention, the mutually fixed portions between the PCB and the frame are formed rectangular, and the rectangular four corner portions are attached by an adhesive.

In order to obtain the above objects, there is further provided an optical pick-up device including: a yoke plate having yokes formed at a front side where a magnetic body and a magnetic driving unit are positioned to drive an objective lens; and a frame fixed to the rear side of the yoke plate, wherein an insertion portion is formed at a rear side of the yoke plate and an insertion hole is formed at the frame so that the insertion portion is press-fit to the insertion hole, thereby fixing the frame to the yoke plate.

In the optical pick-up device of the present invention, the PCB is fixed to the frame by being attached at least three portions by using an adhesive without a screw.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The optical pick-up device in accordance with one embodiment of the present invention will now be described with reference to FIGS. 6 through 12.

Figure 1:
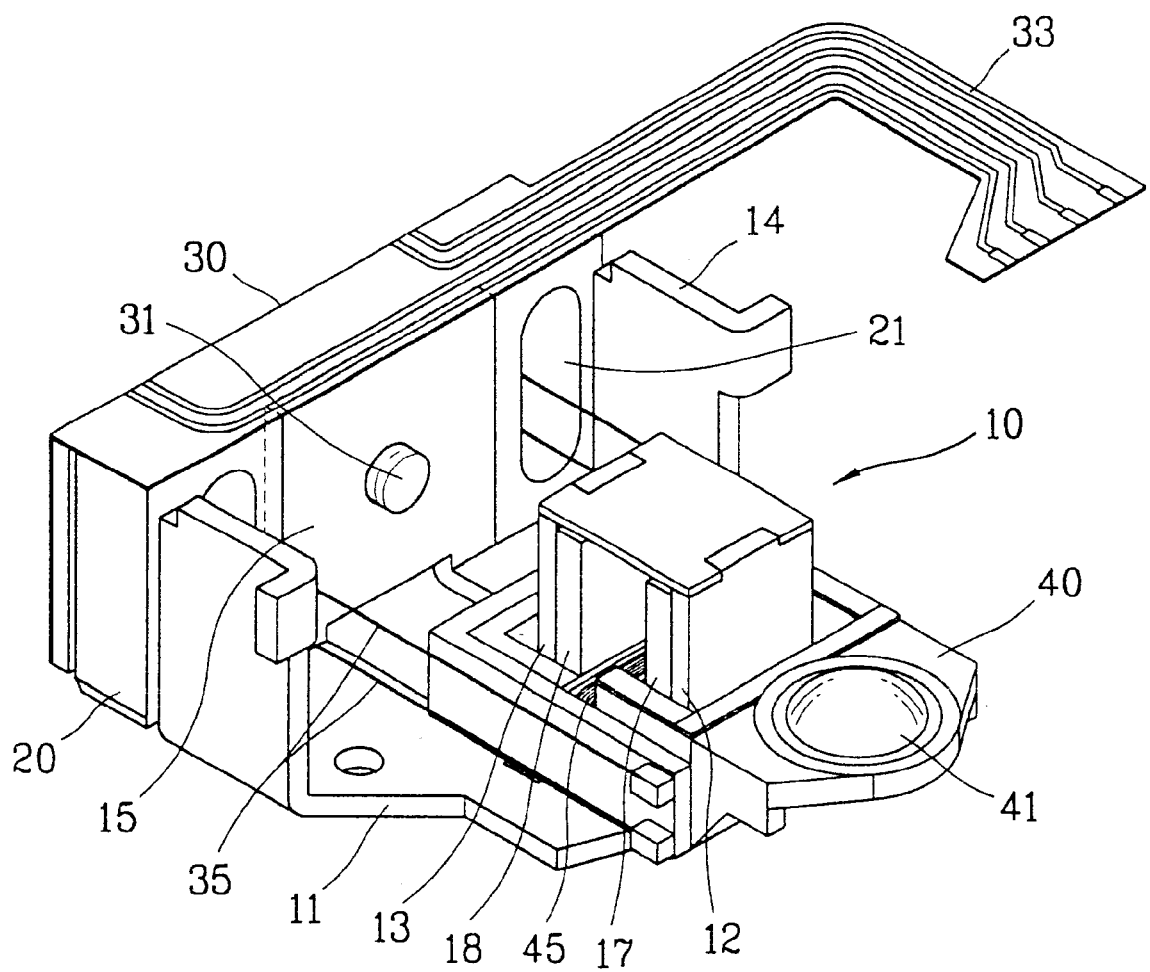
FIG. 1 is a perspective view showing an optical pick-up device in accordance with a conventional art.
Figure 2:
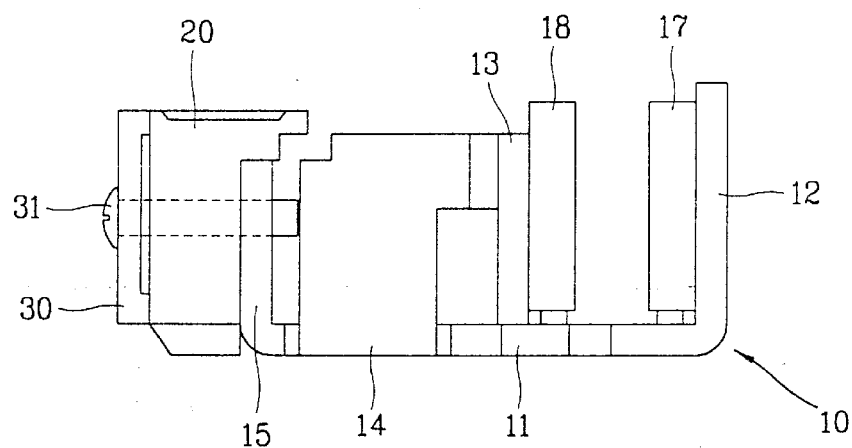
FIG. 2 is a side view showing the coupling structure between a yoke plate, a frame and a PCB of the optical pick-up device in accordance with the conventional art.
Figure 3:
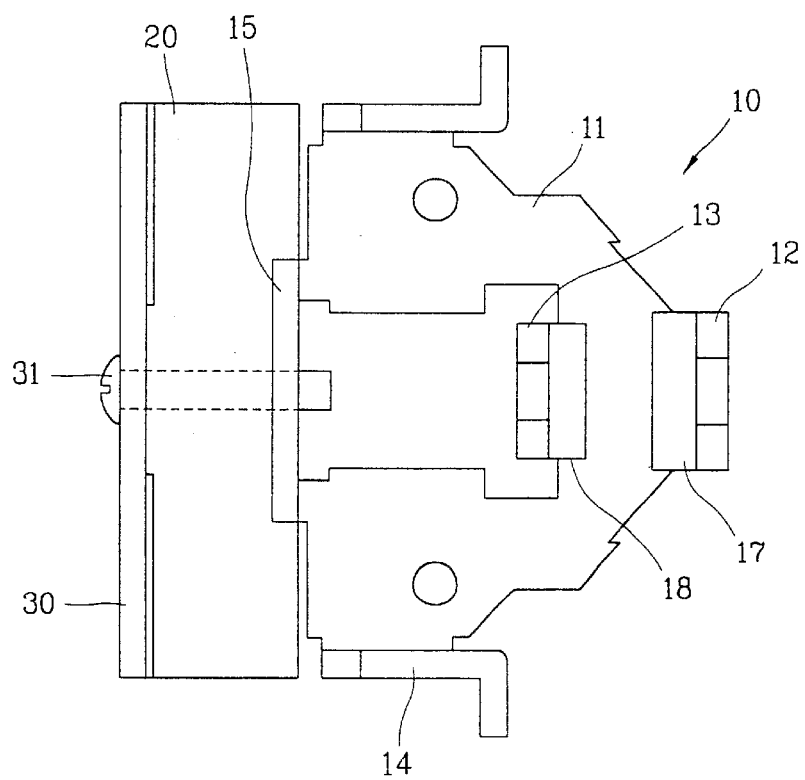
FIG. 3 is a plan view showing the coupling structure between the yoke plate, the frame and the PCB of the optical pick-up device in accordance with the conventional art.
Figure 4:
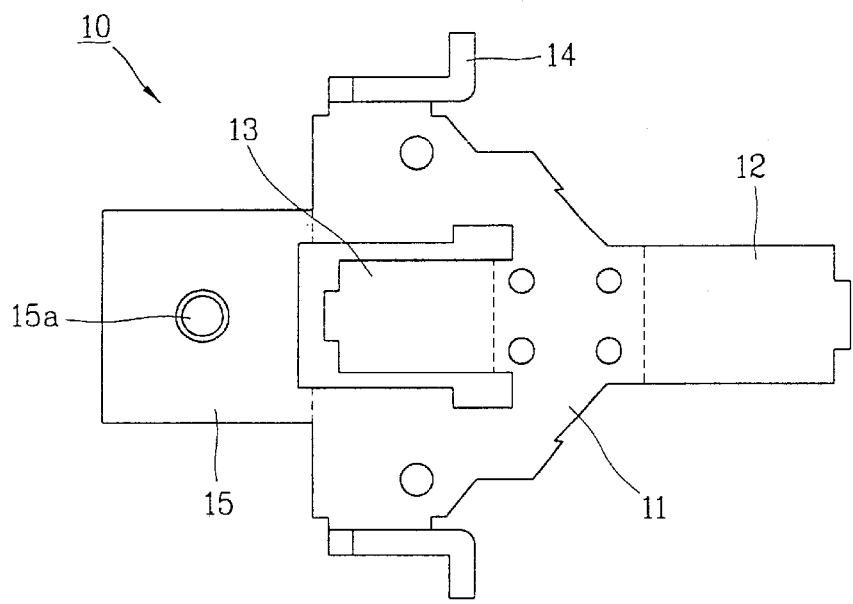
FIG. 4 is a development view of the yoke plate of the optical pick-up device in accordance with the conventional art.
Figure 5:
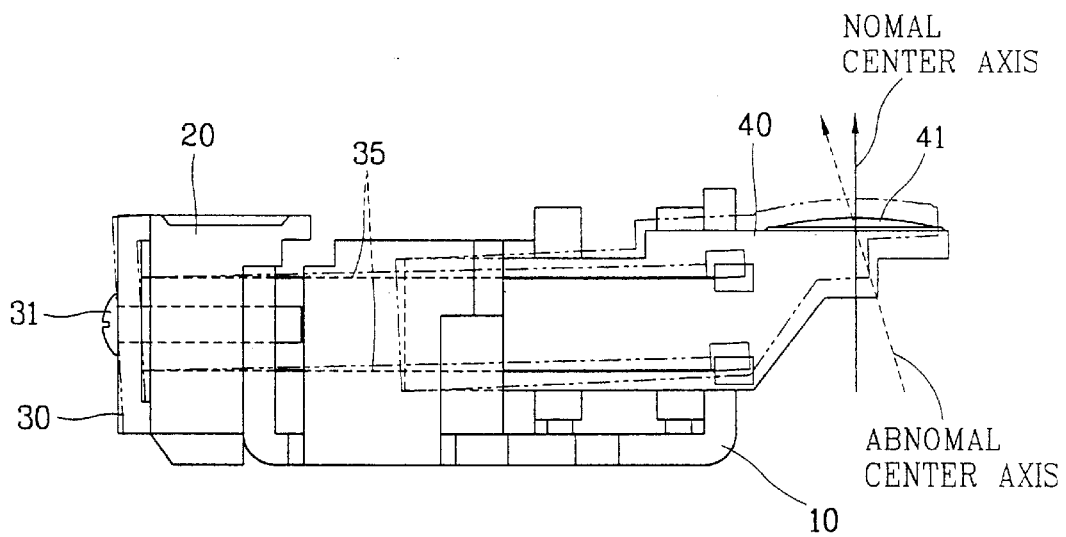
FIG. 5 is a reference view showing the operation state of the optical pick-up device in accordance with the conventional art.
Figure 6:
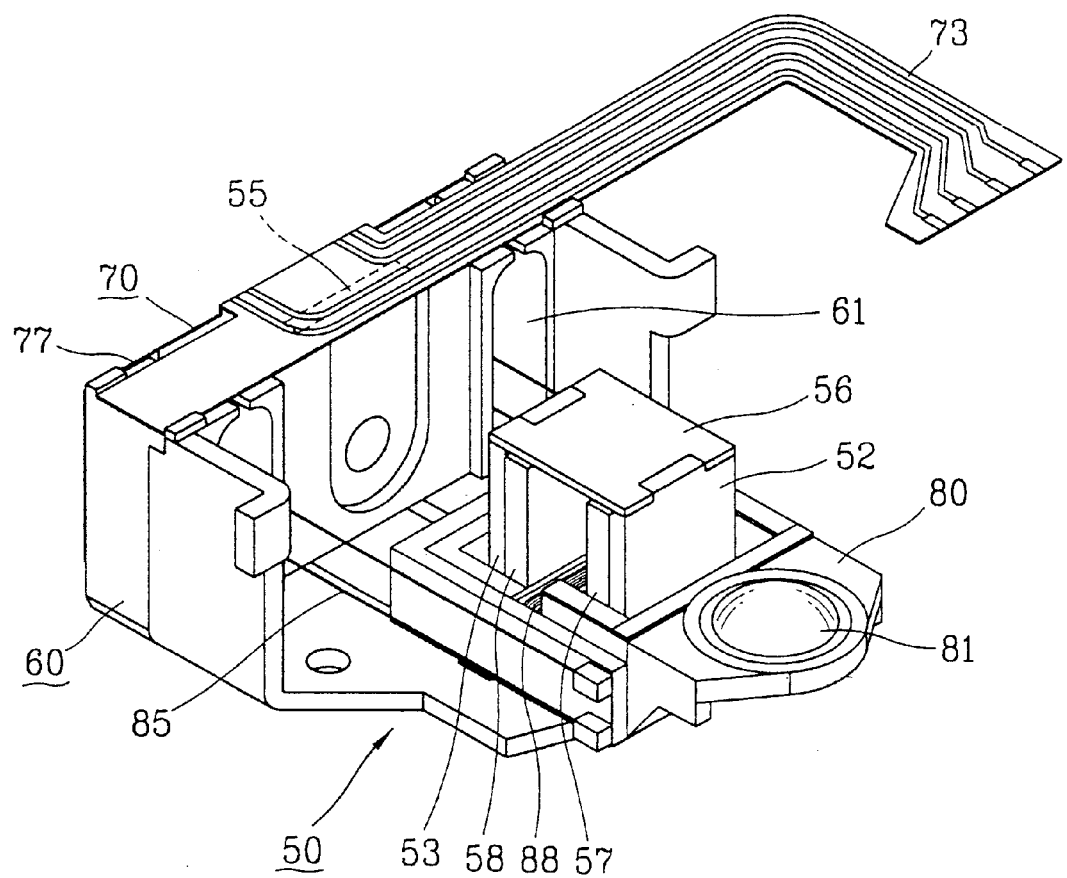
FIG. 6 is a perspective view showing an optical pick-up device in accordance one embodiment of the present invention.

FIG. 6 is a perspective view showing an optical pick-up device in accordance one embodiment of the present invention.

In the optical pick-up device of the present invention, a frame 60 is fixed by an insert-molding method at the rear side of a yoke plate 50, and a PCB 70 connected to the optical pick-up driving circuit through a flexible print circuit (FPC) 73 is threaded at the rear side of the frame 60 and at the same time adhered to be fixed by using an adhesive 77.

An outer yoke 52 and inner yoke 53 stand at the front side of the yoke plate 50, and permanent magnets 57 and 58 are fixed to be positioned in a facing manner at the two yokes 52 and 53.

A holder 80 is positioned at the front side of the yoke plate 50, and supported by four suspension wires 85 connected to the PCB 70.

The holder 80 includes an objective lens 81 for focussing a light radiated from a light source on a recording layer of an optical disk and magnetic driving coils 88 for varying the position of the holder 80 vertically and horizontally owing to the mutual interaction with the permanent magnets 57 and 58.

Figure 7:
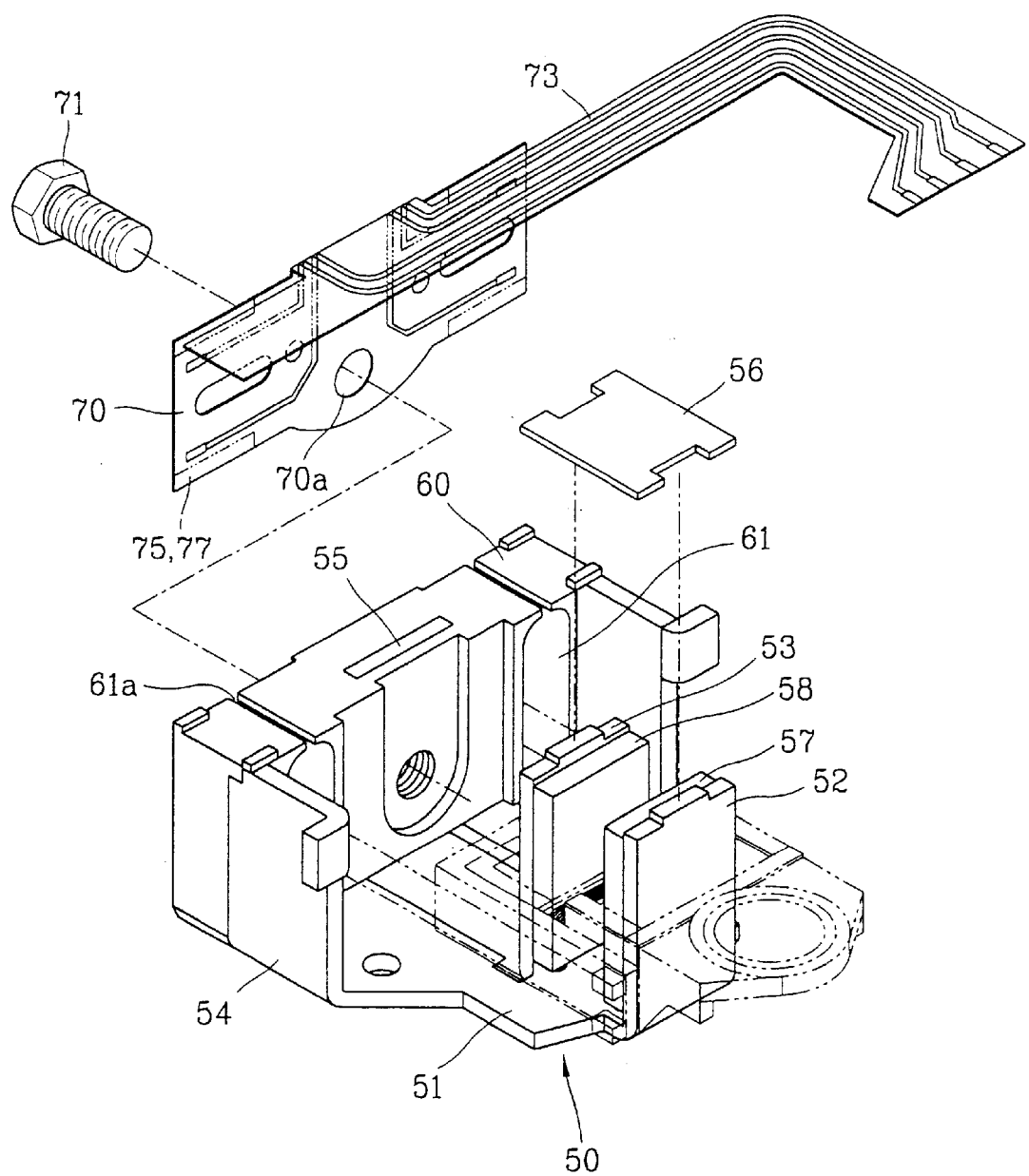
FIG. 7 is an exploded perspective view showing the coupling structure between a yoke plate, a frame and a PCB of the optical pick-up device in accordance with one embodiment of the present invention.
Figure 8:
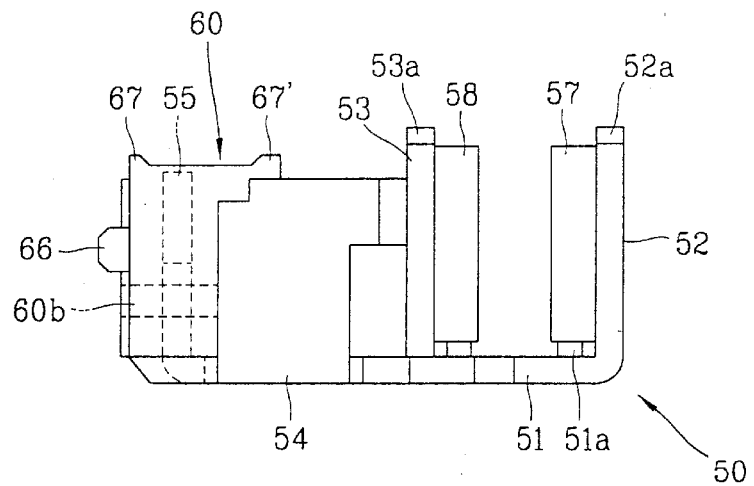
FIG. 8 is a side view showing the coupling structure between the yoke plate, the frame and the PCB of the optical pick-up device in accordance with one embodiment of the present invention.
Figure 9:
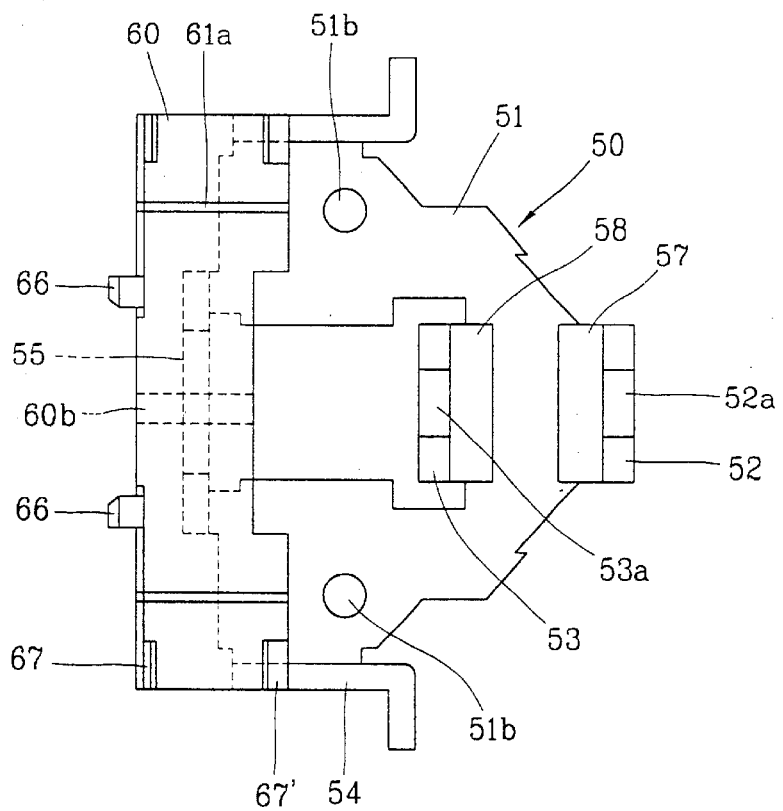
FIG. 9 is a plan view showing the coupling structure between the yoke plate, the frame and the PCB of the optical pick-up device in accordance with one embodiment of the present invention.
Figure 10:
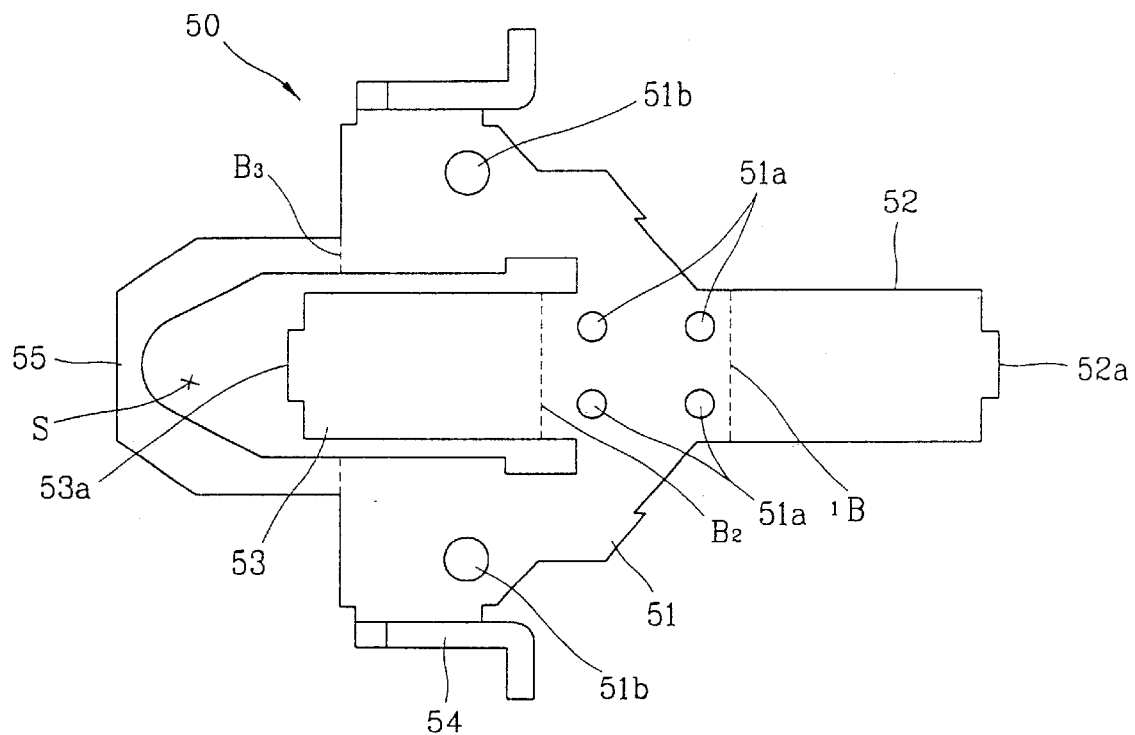
FIG. 10 is a development view of the yoke plate included in the optical pick-up device in accordance with one embodiment of the present invention.

FIG. 7 is an exploded perspective view showing the coupling structure between a yoke plate, a frame and a PCB of the optical pick-up device in accordance with one embodiment of the present invention, FIG. 8 is a side view showing the coupling structure between the yoke plate, the frame and the PCB of the optical pick-up device in accordance with one embodiment of the present invention, FIG. 9 is a plan view showing the coupling structure between the yoke plate, the frame and the PCB of the optical pick-up device in accordance with one embodiment of the present invention, and FIG. 10 is a development view of the yoke plate included in the optical pick-up device in accordance with one embodiment of the present invention.

First, referring to the yoke plate 50, the outer yoke 52 formed bent in the orthogonal direction to a bottom portion 51 at the front side of the bottom portion 51. The inner yoke 52 is cut at the central portion of the bottom portion 51 and bent in the same direction to the outer yoke 52. Side portions 54 are formed bent upwardly at both sides of the bottom portion 51 to thereby support the both side portions of the frame 60.

An insertion portion 55 is formed bent in the orthogonal direction to the bottom portion 51 at the rear side of the bottom portion 51 so that the frame 60 is fixed thereto by the insert-molding method.

The outer yoke 52, the inner yoke 53 and the insertion portion 55 are bent at bending lines B1, B2 and B3 as shown in FIG. 10 and stand vertically to the bottom portion 51.

Especially, as for the inner yoke 53, its upper portion is cut and bent at the inner side of the insertion portion 55 beyond the line B3 where the insertion portion 55 is bent from the bottom portion 51.

Accordingly, the insertion portion 55 is formed in a 'U' shape and a space 'S' is provided for enlarging the size of the inner yoke 53, so that the inner yoke 53 can be formed with the same size as that of the outer yoke 52 even without increasing the overall size of the yoke plate 50.

As shown in FIG. 7, a stopper plate 56 is connected at the upper portion of the outer yoke 52 and the inner yoke 53 to restrict the movement of the holder 80 to a predetermined range.

With reference to FIGS. 8 through 10, reference numeral 51a of the yoke plate 50 is a protrusion formed to support the permanent magnets 57 and 58, and two 51b are holes through which the yoke plate 50 is threaded with a base (not shown) by using a screw. Reference numerals 52a and 53a are coupling protrusions to which the stopper plate 56 is coupled.

As shown in FIG. 7, the frame 60 is fixed to the yoke plate 50 by being molded in a state that the insertion portion 55 of the yoke pate 50 is inserted therein.

The frame 60 may be made of a hard synthetic resin material so as to be fixed by the insert-molding method and formed in a hexahedral shape with the insertion portion 55 inserted at the central portion thereof.

The frame 60 includes two holes 61 through which the suspension wires 85 are to pass. The holes 61 include an opening portion 61a at the upper portion to allow the suspension wires 85 to be easily inserted.

The suspension wires 85 are fabricated of a conductive material to enable a signal outputted from the PCB 70 to be applied to the magnetic driving coils 88.

Reference numeral 66 of FIGS. 7 through 9 denotes protrusions to which the PCB 70 is coupled, 67 denotes protrusions for supporting the FPC 73 so as not to be released, and 60b is a thread hole to which the PCB 70 is assembled by a screw 71.

The PCB 70 is threaded by the screw 71 with the frame 60 as well as being adhered thereto by using an adhesive 77.

Figure 11:
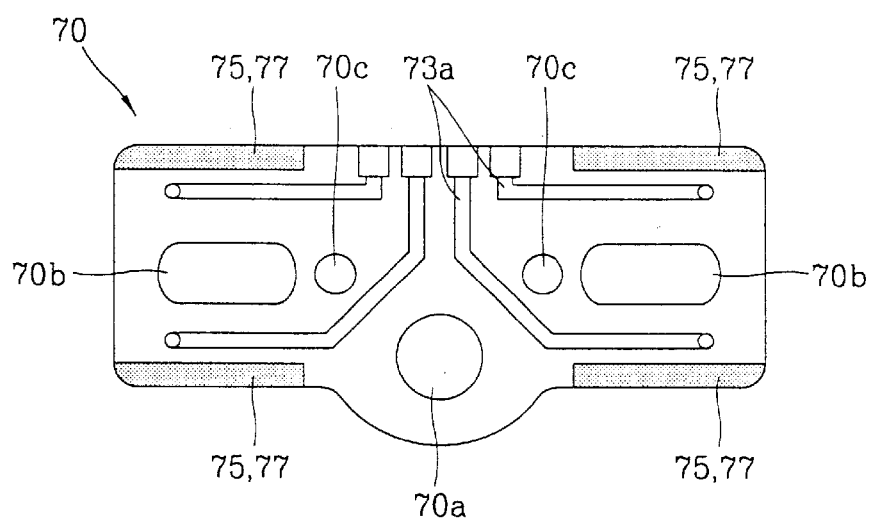
FIG. 11 is a front view of the PCB included in the optical pick-up device in accordance with one embodiment of the present invention.

FIG. 11 is a front view of the PCB included in the optical pick-up device in accordance with one embodiment of the present invention.

As shown in FIG. 11, the PCB 70 includes a thread hole 70a formed at a central lower portion thereof, to which the frame 60 is assembled by the screw 71, and bonding portions 75 are formed at four rectangular corner portions, both upper and lower portions of the thread hole 70a, to which the adhesive 77 is attached.

At the PCB 70, four circuit patterns 73 are formed to print a circuit connected to the four suspension wires 85, and holes 70c are formed at the upper portion of the thread hole 70a, into which the protrusion 66 of the frame 60 of FIG. 9. Through holes 70b are formed at both sides of the holes.

With reference to FIG. 7, the PCB 70 is threaded with the frame 60 and at the same time, the four portions of both sides of the screw 71 are adhered to the frame 60 by using the adhesive 77, so that the PCB 70 would not be shaken from the frame 60.

The operation and effect of the optical pick-up device in accordance with one embodiment of the present invention constructed as described above will now be explained.

When the frame 60 is fixed to the insertion portion 55 of the yoke plate 50 by the insert-molding method, the insertion portion 55 is inserted into the central portion of the frame 60 and the both faces of the frame are supported by the side portions 54.

At this time the frame 60 is integrally combined to the yoke plate 50.

As the frame 60 is integrally coupled by being insert-molded in the insertion portion 55, the insertion portion 55 does not need to be assembled in the method of screw engagement like in the conventional art. Accordingly it is not necessary to form a thread hole for assembling a screw to the insertion portion 55, and thus, as shown in FIG. 10, the inner yoke 53 can be enlarged by being extended up to the inner central portion of the insertion portion 55.

Accordingly, since the inner yoke 53 can be formed relatively high, the inner yoke 53 and the outer yoke 52 can be formed having the same height and area.

In the optical pick-up device, the frame 60 is firmly fixed at the yoke plate 50 so that it won't be shaken even without an engaging unit such as a screw.

In addition, since the coercive force of the inner yoke 53 and the outer yoke 52 can be maintained the same, such a problem that the coercive force of the permanent magnet is restricted to degrade the operation characteristic of the optical pick-up device as in the conventional art, can be solved.

With reference back to FIG. 6, in the optical pick-up device, when a drive signal is inputted through the PCB 70 to the magnetic driving coils 88, the magnetic driving coils 88 and the permanent magnets 57 and 58 interact to each other, according to which the holder 80 is moved vertically and horizontally, varying the position of the objective lens 81.

As the position of the objective lens 81 is varied, a focusing or a tracking operation can be performed to vary the focal point of the beam spot formed on the record face of the optical disk.

Since the PCB 70 is fixed to the frame 60 by the screw 71 and the adhesive 77, when then holder 80 is moved vertically and horizontally, it wouldn't be shaken vertically and horizontally.

Figure 12:
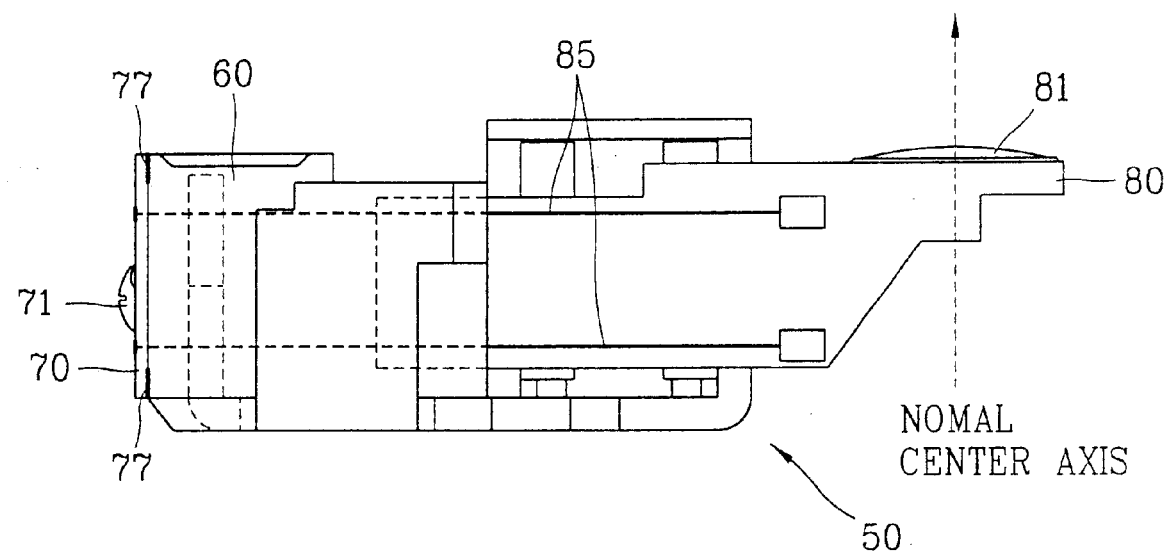
FIG. 12 is a side view showing an operation state of the optical pick-up device in accordance with one embodiment of the present invention.

Accordingly, in the present invention, since the PCB 70 and the frame 60 are fixed to the yoke plate 50 without being shaken, as shown in FIG. 12, a phenomenon that the holder 80 supported by the suspension wires 85 is abnormally moved is prevented, and accordingly, the central axis of the objective lens 81 is constantly moved from the center, so that a normal focussing and tracking operation can be performed.

An optical pick-up device in accordance with another embodiment of the present invention will now be described with reference to FIG. 13.

Figure 13:
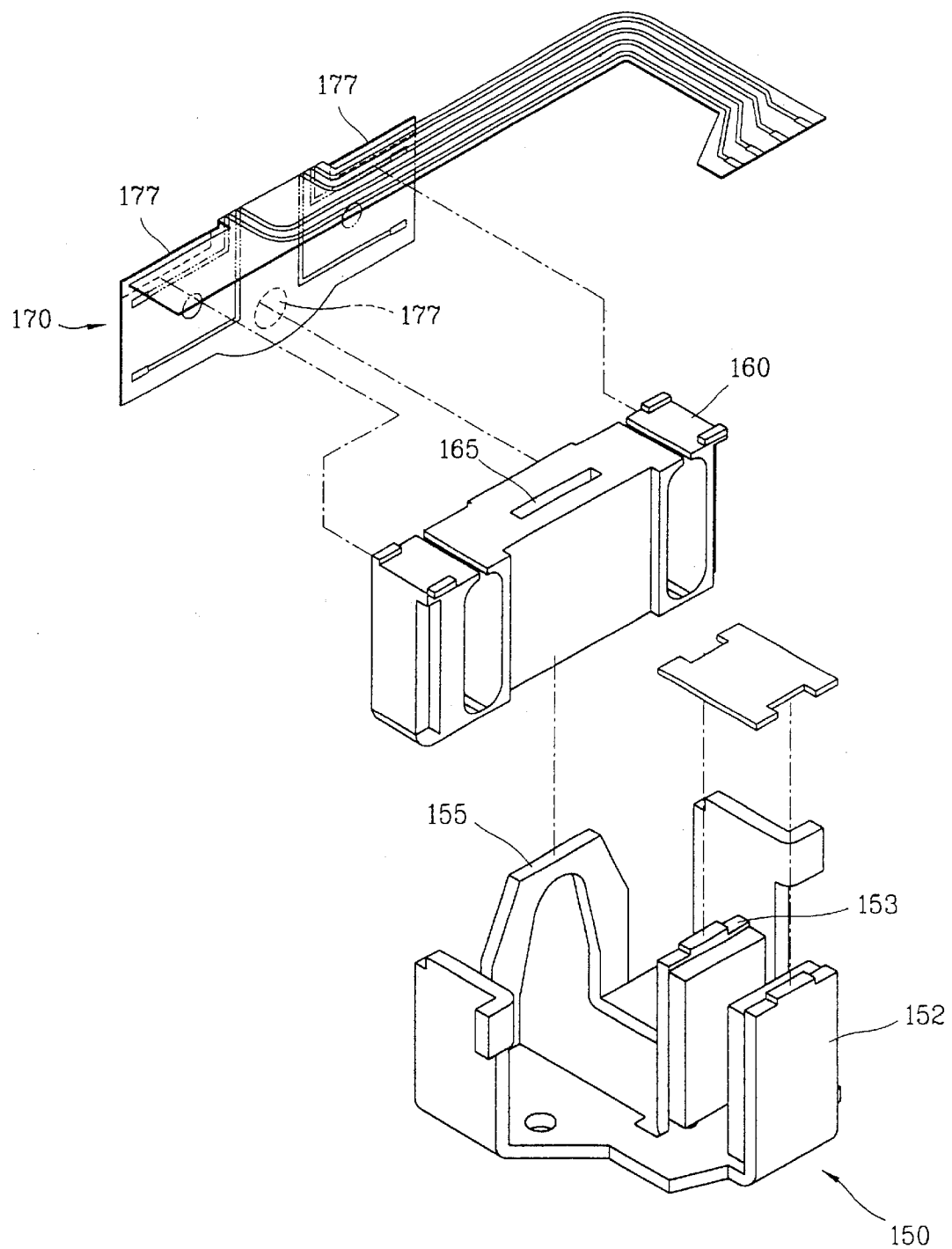
FIG. 13 is an exploded perspective view showing the coupling structure between a yoke plate, the frame and a PCB of an optical pick-up device in accordance with another embodiment of the present invention.

FIG. 13 is an exploded perspective view showing the coupling structure between a yoke plate, the frame and a PCB of an optical pick-up device in accordance with another embodiment of the present invention.

Unlike the former embodiment of the present invention in which the frame is fixed to the yoke plate by the insert molding method and the PCB is fixed to the frame by the screw and the adhesive, a feature of another embodiment of the present invention is that a frame 160 is press-fit to a yoke plate 150 and a PCB 170 is fixedly attached to the frame 160 by only an adhesive 177 without using a screw.

That is, an insertion portion 155 is formed at the rear side of the yoke plate 150 and an insertion hole 165 is formed at the frame 160.

Accordingly, the insertion portion 155 of the yoke plate 150 is forcibly press-fit to the insertion hole 165 of the frame 60, so that the frame 160 is fixed to the yoke plate 150.

In this respect, preferably, the insertion portion 155 and the insertion hole 165 have such a size that they are mutually press-fit to be coupled and are not easily released from each other, and an adhesive may be used as necessary to attach them more firmly.

The PCB 170 and the frame 160 are attached by the adhesive at least three portions and fixed together.

Namely, as shown in FIG. 13, the adhesive 177 is coated at the both upper portions and the lower central portion of the PCB 170 and then the PCB is fixedly attached to the frame 160.

Of course, four corner portions and the central portion of the PCB 170 may be coated with the adhesive 177 and the PCB is attached to the frame 160.

The optical pick-up device in accordance with another embodiment of the present invention has the following advantages.

For example, since the frame 160 is press-fit to the yoke plate 150 and the PCB 170 with several portions coated with the adhesive 177 is fixedly attached to the frame 160, it is not necessary to use an engaging member such as a screw, so that its assembly can be improved and the frame 160 and the PCB 170 can be prevented from being shaken.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An optical pick-up device comprising:
    a yoke plate having yokes formed at a front side where a magnetic body and a magnetic driving coil are positioned to drive an objective lens;
    a frame fixed to the yoke plate in such a manner that a portion of the rear side of the yoke plate is inserted thereinto; and
    a PCB with at least two portions fixed to the frame, for applying a drive signal to the magnetic driving coil.

2. The device of claim 1, wherein the yoke plate has an insertion portion bent in the orthogonal direction to a bottom portion so that the frame can be molded.

3. The device of claim 1, wherein the yoke plate further comprises:
    an outer yoke bent in the orthogonal direction to a bottom portion at the front side; and
    an inner yoke cut at the middle portion of the yoke plate and bent in the same direction of said outer yoke.

4. The device of claim 1, wherein the frame includes an insertion hole for receiving said portion of said rear side of said yoke plate.

5. An optical pick-up device comprising:
    a yoke plate having yokes formed at a front side where a magnetic body and a magnetic driving coil are positioned to drive an objective lens; and
    a frame molded to the yoke plate in a state that a portion of the rear side of the yoke plate is inserted thereinto.

6. The device of claim 5, wherein the yoke plate has an insertion portion bent in the orthogonal direction to a bottom portion so that the frame can be molded.

7. The device of claim 6, wherein the yoke plate comprises:
    an outer yoke bent in the orthogonal direction to a bottom portion at the front side; and
    an inner yoke cut at the middle portion of the yoke plate and bent in the same direction of the outer yoke,
    wherein the outer yoke and the inner yoke are formed having the same size.

8. The device of claim 7, wherein the upper portion of the inner yoke is cut at an inner portion of the insertion portion but beyond a line where the insertion portion is bent from the bottom portion.

9. The device of claim 8, wherein the insertion portion is formed in a 'U' shape.

10. The device of claim 5, wherein the objective lens and the magnetic driving coil are installed at a holder and the holder is supported by a plurality of suspension wires connected to the PCB being fixed to the frame, and the frame includes holes through which the suspension wires pass.

11. The device of claim 10, wherein the holes are formed in such a manner that its upper portion is opened so as for the suspension wires to be easily inserted thereinto.

12. The device of claim 5, wherein the frame includes an insertion hole for receiving said portion of said rear side of said yoke plate.

13. An optical pick-up device comprising:
    a yoke plate having yokes formed at a front side where a magnetic body and a magnetic driving coil are positioned to drive an objective lens;
    a frame fixed to a rear side of the yoke plate, wherein an insertion portion is formed at the rear side of the yoke plate and an insertion hole is formed at the frame so that the insertion portion is press-fit to the insertion hole, thereby fixing the frame to the yoke plate; and
    a PCB with at least two portions fixed to the frame, for applying a drive signal to the magnetic driving coil.

14. An optical pick-up device comprising:
    a yoke plate having yokes formed at a front side where a magnetic body and a magnetic driving coil are positioned to drive an objective lens;
    a frame fixed to a rear side of the yoke plate; and
    a PCB with at least two portions fixed to the frame, for applying a drive signal to the magnetic driving coil.

15. The device of claim 14, wherein thread holes are formed at the PCB and the frame, and the PCB and the frame are mutually fixed as a screw is threaded into the thread holes, and at the same time, at least one portion thereof is attached by an adhesive.

16. The device of claim 15, wherein the at least two portions of both sides of the screw engaging portion are attached by the adhesive so as for the PCB and the frame to be fixed.

17. The device of claim 15, wherein the mutually fixed portions of the PCB and the frame are formed in a rectangular shape, and four rectangular corner portions are attached by the adhesive.

18. The device of claim 14, wherein the PCB and the frame are fixed together as at least three portions are attached by the adhesive.

19. The device of claim 14, wherein the frame includes an insertion hole for receiving a portion of said rear side of said yoke plate.

* * * * *